(12) United States Patent
Gustafsson et al.

(10) Patent No.: US 7,043,818 B2
(45) Date of Patent: May 16, 2006

(54) VEHICLE AXLE AND METHOD AND APPARATUS FOR MANUFACTURING THE SAME

(75) Inventors: Bertil Gustafsson, Boden (SE); Hans Engstrom, Norrfjarden (SE); Klas Nilsson, Lulea (SE)

(73) Assignee: Ferruform AB, (SE)

( * ) Notice: Subject to any disclaimer, the term of this patent is extended or adjusted under 35 U.S.C. 154(b) by 218 days.

(21) Appl. No.: 10/481,214

(22) PCT Filed: Jun. 14, 2002

(86) PCT No.: PCT/SE02/01147

§ 371 (c)(1),
(2), (4) Date: Dec. 17, 2003

(87) PCT Pub. No.: WO02/102609

PCT Pub. Date: Dec. 27, 2002

(65) Prior Publication Data

US 2004/0185946 A1 Sep. 23, 2004

(30) Foreign Application Priority Data

Jun. 18, 2001 (SE) .................................... 0102187

(51) Int. Cl.
*B23P 11/00* (2006.01)
*B21D 39/03* (2006.01)
*F16C 3/00* (2006.01)

(52) U.S. Cl. .................. 29/525.14; 29/428; 464/179

(58) Field of Classification Search .................. 29/428, 29/463, 516, 525.14, 469, 525.13; 219/121.12, 219/121.13, 121.6, 121.63; 464/179
See application file for complete search history.

(56) References Cited

U.S. PATENT DOCUMENTS

| | | | | |
|---|---|---|---|---|
| 1,613,592 A | * | 1/1927 | Smith | 74/607 |
| 3,673,888 A | * | 7/1972 | Moll et al. | 74/607 |
| 3,715,935 A | | 2/1973 | Ebey | 74/607 |
| 4,048,466 A | | 9/1977 | Toth et al. | 219/121 |

FOREIGN PATENT DOCUMENTS

| EP | 0 780 274 | 6/1997 |
|---|---|---|
| EP | 1 053 822 | 11/2000 |

* cited by examiner

*Primary Examiner*—John C. Hong
(74) *Attorney, Agent, or Firm*—Ostrolenk, Faber, Gerb & Soffen, LLP

(57) ABSTRACT

A vehicle shaft has a rigid intermediate portion with a shaft journal welded to each of the two ends of the shaft portion. The shaft journal and/or the intermediate portion are/is provided with a material thickness reduction within a distance a from the contact surfaces which is less than substantially half the material thickness at the contact surfaces, in order to guide the force flow thorough the weld seam. During manufacture of such vehicle shafts, the mutually abutting contact surfaces are laser-welded to form a weld seam which can fully penetrate the material of the shaft journals and the intermediate portion respectively, whereby the concentricity and parallelism of the two journals will be within predetermined dimensional tolerances after the welding and cooling of the material. The arrangement has an induction heater which surrounds the shaft journal and is movable axially so that, after completion of heating, it moves to free the shaft journals welded to the shaft portion.

16 Claims, 2 Drawing Sheets

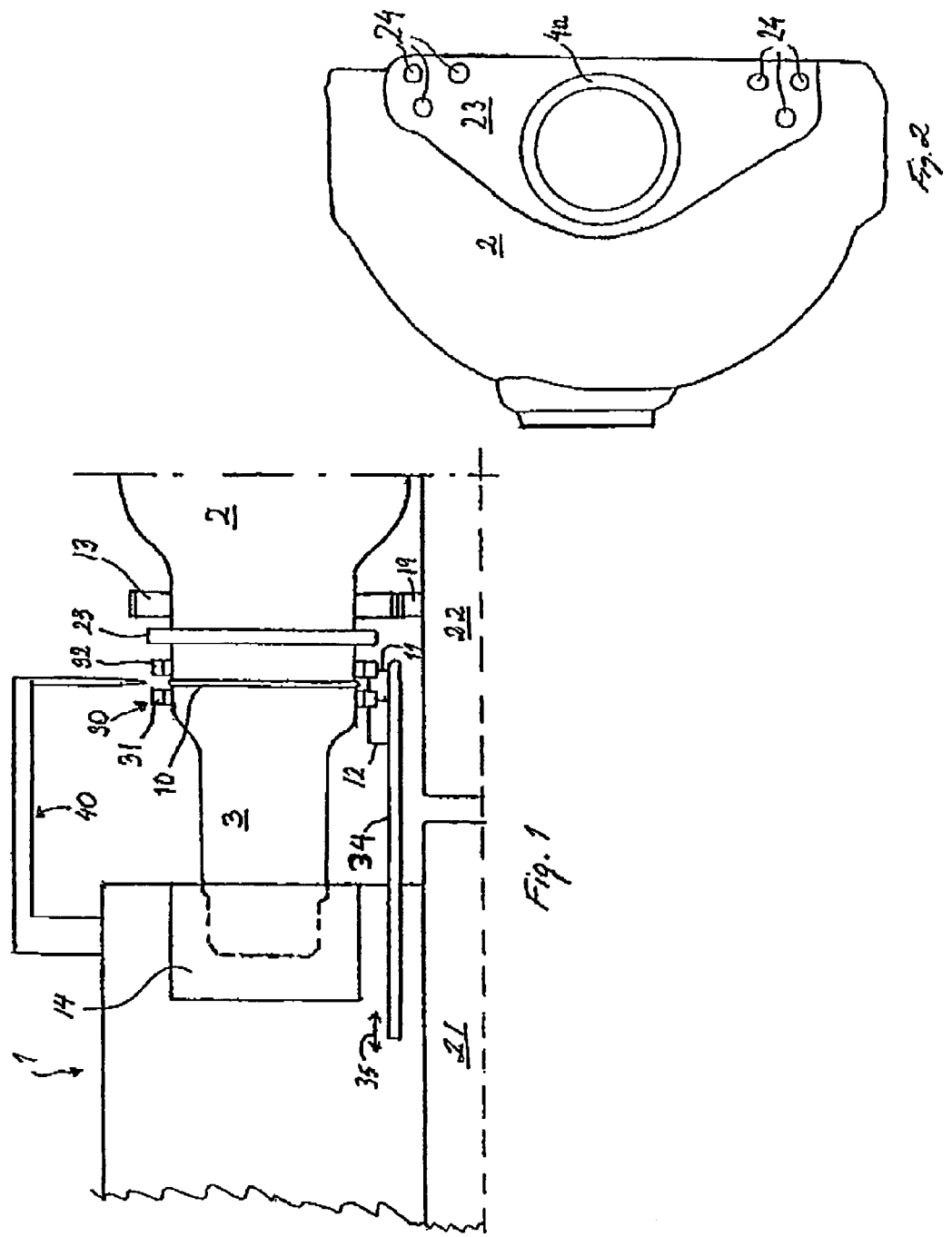

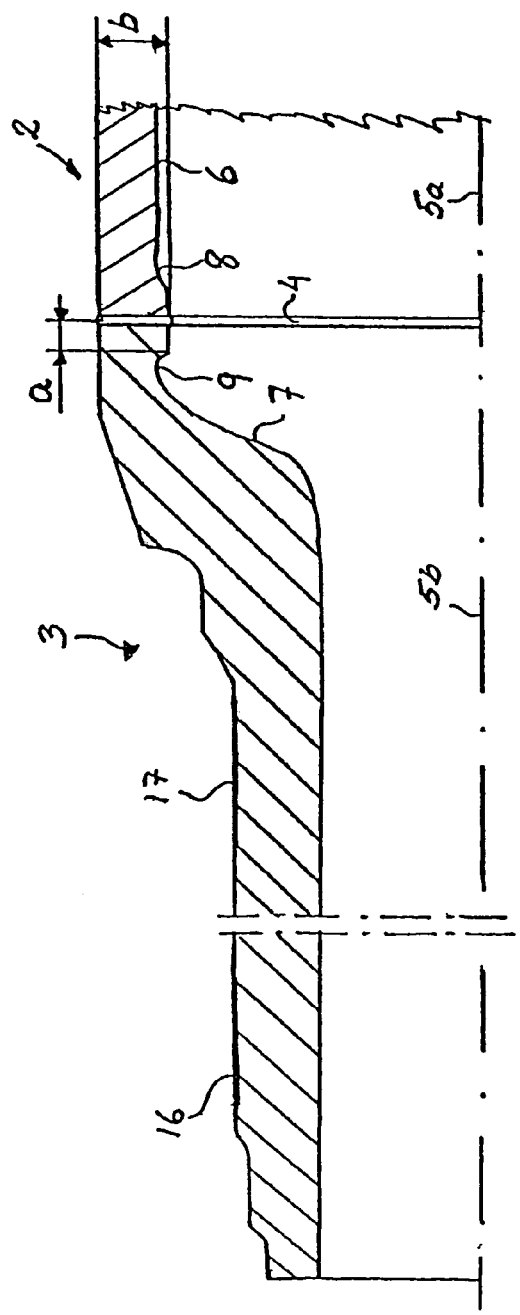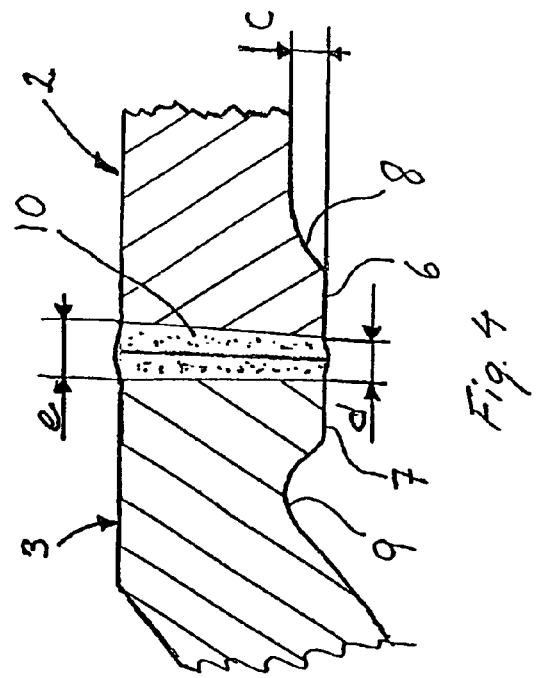

VEHICLE AXLE AND METHOD AND APPARATUS FOR MANUFACTURING THE SAME

The present invention relates to a vehicle shaft with attached end journals shaped to obtain strength characteristics, and to a process of manufacturing a vehicle shaft by welding and an arrangement for implementing that process.

STATE OF THE ART

A vehicle shaft in the form of an intermediate shaft portion with welded-on shaft journals and a method of manufacturing such a shaft are already known from U.S. Pat. No. 4,048,466. In that case the axial ends of the shaft journals, as also the axial ends of the rear axle beam which cooperate with them, are provided with a special shoulder intended to maintain a correct position of the journals relative to the rear axle beam during welding. That method entails the whole of the shaft journals being finish-machined before being welded to a rear axle beam by electron beam welding.

Also, a practice known from European patent specification EP 1 053 822 in the laser welding of a gearwheel to a shaft is to combine the laser welding with induction heating of the weld region. An annular induction arrangement surrounds the shaft and exhibits an aperture through which the welding beam can pass during the process.

OBJECTS OF THE INVENTION

One object of the present invention is to configure a vehicle shaft with a rigid middle portion whereby finish-machined shaft journals are welded to the respective shaft ends of the intermediate shaft portion. The vehicle shaft has to satisfy severe strength requirements and make possible a rational method of manufacture, particularly as regards easy and quick permanent welding of the shaft journals to the intermediate shaft portion.

According to the invention, the respective shaft journals and the intermediate shaft portion have substantially the same material thickness at the contact surfaces. In addition, the intermediate shaft portion and at least one of the respective shaft journals are provided with a material thickness reduction within a distance from the contact surfaces which is equal to less than half the material thickness at the contact surfaces. This means that the stresses in the material can be guided away from the weld seam surface, which is essential since it is here that fracture indications which are difficult to prevent in rational welding may occur. It thus becomes possible for the weld seam to conform to high strength requirements. Alternatively the weld seam may be executed with less precision, more quickly or in some other way which contributes to a less expensive operation without putting specified strength requirements at risk.

In another embodiment of the invention, both the respective shaft journals and the shaft portion before mutual contact of the surfaces are provided with a smaller material thickness at a distance from the contact surface which is equal to less than half the material thickness which the respective contact surfaces exhibit.

Another object of the invention is to enable rational manufacture of vehicle shafts. The shaft ends and the shaft journals having the same material thickness and being machined to cooperating planes makes it possible in the process according to the invention for laser welding at reasonable powers and feed rates to be used, thereby making rational manufacture possible. At the same time, the welding beam may be given a focus which creates the possibility of a weld seam which goes through even relatively thick material and satisfies the requirement for high strength. By limiting the extent of the welding beam and hence of the weld seam; the thermal effects on surrounding material can be limited. A relatively moderate clamping force will hold the workpieces fixed in position and there will be no need for direction correction measures after the welding. It will nevertheless be possible for the shaft journals and the intermediate shaft portion to be within the predetermined dimensional tolerances.

The shaft journals and the shaft portion are made of steel material and the mutually abutting end surfaces are preheated in a region which to equal extents surrounds the surfaces before the welding is executed in that region. Preheating reduces the risk of stresses within the weld region, thereby causing less risk of cracks and other defects in the weld seam and its vicinity.

A further object of the invention is to enable rational manufacture of a vehicle shaft. To this end, the invention is distinguished by an arrangement for welded attachment. Accordingly, the preheating is by a means of an induction arrangement which is synchronised to effect an axial movement to a position intended for the preheating. The movement takes place in conjunction with axial movement of the respective shaft journals to abut against the shaft portion. This makes possible a rational preheating operation which can easily be combined with movements of the shaft journals, thereby facilitating the handling of the workpieces both before and after the welding operation.

Arranging the induction heating arrangement indicated therein to surround the shaft journals at two outer machine members of a machine-tool whose central machine member supports the intermediate shaft portion makes a rational manufacturing sequence possible with a relatively simple machine-tool set-up.

Other distinguishing features of the invention are indicated in the ensuing description of an exemplifying embodiment of the invention.

BRIEF DESCRIPTION OF THE DRAWINGS

FIG. 1 depicts schematically a machine-tool for manufacturing a vehicle shaft according to the invention in accordance with the process according to the invention.

FIG. 2 depicts an end view of the intermediate shaft portion.

FIG. 3 depicts the configuration of a shaft journal of a vehicle shaft according to the invention and its connection to the intermediate shaft portion.

FIG. 4 depicts finally an enlargement of a section through the weld seam and adjacent parts of one shaft journal and the intermediate shaft portion.

DESCRIPTION OF AN EMBODIMENT

FIG. 1 depicts a machine-tool (hereinafter also called the welding machine) in which an intermediate shaft portion 2 and a shaft journal 3 which is connectable to the latter are clamped. Said shaft portion takes the form here of a usual type of heavy vehicle rear axle beam, and the two terms are used interchangeably. Only one half of the beam appears in the diagram. It is to be understood that the rear axle beam has the corresponding other half clamped in a corresponding other half of the machine 1.

FIG. 2 shows the shaft portion 2 having at each of its respective ends a terminal surface 4a which is annular—with advantage, circular—and which symmetrically surrounds a central axis 5a which is substantially perpendicular to the terminal surface 4a (see FIGS. 2 and 3). A brake bracket 23 is also welded to the rear axle beam 2 to support braking equipment (not depicted) fastened to the vehicle shaft by undepicted threaded connections in holes 24. It is to be understood that the respective journals 3 each exhibit a corresponding circular terminal surface, and the part-section of the mutually abutting terminal surfaces is hereinafter denoted by ref. 4.

FIG. 3 and the enlargement which appears in FIG. 4 depict a section of the connection by a weld seam 10 between a shaft journal 3 and the axle beam 2. The diagram shows a preferred embodiment of a vehicle shaft according to the invention whereby the inner surfaces 6 and 7 respectively of the end portions of the axle beam 2 and the shaft journals 3 respectively which are to be welded together are each provided with a material thickness reduction 8 and 9 respectively at a distance a from the mutually facing contact surfaces 4. With advantage, said distance a is equal to between 25 and 50% of the material thickness b of the contact surfaces. The material thickness reduction c is itself of the order of 15 to 30% of the material thickness b of the contact surfaces, advantageously about 25% of said thickness. In addition, the material thickness reduction takes the form of a gently arcuate transition from the larger to the smaller material thickness or of a substantially semicircular recess on the inner surface of the material. The recess has a radius which is equal to or larger than half the material thickness reduction. The end portion of the axle beam 2 may with advantage be upset in the heated state to bring about the desired material thickness change on its inner surface 6. The inner surface 7 of the shaft journal 3 is provided with a corresponding material thickness change by a turning operation.

When the vehicle shaft is under load, said reductions in material thickness guide the flow of forces through the shaft journals 3 and axle beam 2 respectively so that any crack indications on the inner surface of the weld seam 10 need not entail any decrease in the strength of the parts 2 and 3 welded together.

In the event of less severe strength requirements, however, the axle beam 2 is merely cold-machined, in which case it may, in an undepicted embodiment, exhibit no material thickness changes in the portion adjacent to the terminal surface 4a. In such cases the shaft journal dimension change is sufficient to direct the force flow when the shaft is under load away from any crack indications close to the inner surface of the weld seam 10.

The axle beam 2 is made in a conventional manner of heavy steel plate, material thickness between 7 and 15 mm, advantageously of special steel with carbon content not exceeding 0.2%, e.g. with designation SSEN 552158, welded along a central seam (not depicted here) to form a hollow unit. The latter is given the shape desired and is machined to create the necessary bearing seats and contact surfaces for accommodating, at a later stage of production, driveshafts and a central drive power transmission gear, a so-called central gear. In such cases, the annular circular terminal surface 4a of the axle beam 2 is also machined to predetermined surface fineness in a normal plane to the central axis 5a.

The shalt journals 3 are forged of a steel material with carbon content of the order of less than 0.35%, e.g. a steel with designation SSEN 512225. Their outer surface will have been turned in a prior machining operation in a separate machine-tool to create bearing race surfaces 16 and 17 respectively for a conventional wheel bearing, and in certain cases the outer end of each journal 3 is milled to create splines for hub gear fitting and/or screw threads for locknuts. Milling is applied to machine their annular terminal surface corresponding to the terminal surface 4a of the shaft portion 2 to a predetermined surface fineness so as to form a normal plane to a central axis 5b for the shaft journal. In alternative embodiments, the terminal surface of the shaft journal 3 maybe machined to some other rotationally symmetrical shape which can cooperate with a complementary configuration of the terminal surface 4a of the axle beam 2.

A method for welding the vehicle shaft is described below. FIG. 1 shows how the machine tool 1 fixes the intermediate shaft portion 2 in a predetermined position by means of annular fixtures 13 which surround the end portions of the shaft portion 2 which face the respective shaft journals 3. Fixing in the predetermined position is achieved by a central member 22 of the machine 1 being able to adjust the position of the shaft portion 2 in every degree of freedom. Powered rollers 19 supported on the machine-tool 1 can be used, for example, to cause the fixtures 13, and hence the shaft portion 2, by gear interaction to rotate at a predetermined speed about their central axis 5a.

In a manner not here depicted, the respective shaft journals 3 are placed either manually or by robot in a conventional clamping chuck 14 situated in the machine-tool 1 and are fixed therein. The shaft journals 3 may in a conventional manner be caused to rotate at a predetermined speed about their respective central axes 5b, in which case this rotation takes place synchronously with the previously mentioned rotation of the shaft portion 2.

Fixing the shaft journals 3 in the machine 1 entails ensuring that the relative mutual position of the shaft journals 3 is within a predetermined tolerance limit as regards the parallelism of their respective cylindrical bearing race surfaces 16 and 17 (see FIG. 3). To this end, the machine-tool 1 is provided with conventional setting facilities for setting the workpieces in every degree of freedom. The axis between the centrepoints of the outer ends of the two shaft journals 3 is then compared with the central axis 5b of the machined outer and inner wheel bearing races surfaces 16, 17 of the respective shaft journals 3. The distance between the respective central axes along 100 mm should not exceed X mm. For heavy highway vehicles said tolerance limit X has to be of the order of 0.06/100. Moreover, the material thickness b at the terminal surfaces 4 of both the shaft portion 2 and the shaft journals 3 will be substantially the same, i.e. with ±10% of the material thickness b.

In this situation, the terminal surfaces 4b of the respective shaft journals 3 are brought towards the corresponding terminal surfaces 4a of the intermediate shaft portion 2. This is achieved by a certain predetermined force exerted by outer members 21 of the machine 1, advantageously a force of the order of 50 kN, which causes close mutual contact of the surfaces. A gap may nevertheless occur along certain parts of the mutually facing circular contact surfaces 4. Excessive connecting force may result in the axle beam 2 becoming deformed, with the risk that subsequent springback after completion of the operation may prevent conformity to specified requirements as regards parallelism etc. An aforesaid rotation of the workpieces 2,3 may only take place when the latter have been brought into mutual contact with the predetermined force.

An induction heating arrangement 30 in the form in this case of two mutually alongside concentric induction rings 31,32 surrounds and is concentric with the shaft journal 3. The induction rings 31,32 are fastened to a carrier 34 and are thereby arranged for axial movement as a unit independently of the shaft journal 3 and are connected to the member 21 (depicted in FIG. 1) of the machine 1 in which the shaft journal 3 is clamped. The axial mobility is illustrated by the two-way arrow 35. In the position of rest at the time of clamping the shaft journal 3 in the machine 1, the induction rings 31,32 are in an outer position relative to the centre of the machine 1 and close to the chuck 14 in which the shaft journal 3 is clamped. The movement of the induction rings 31,32 is effected by conventional power-generating electro-hydraulic means (not depicted) controlled by a computer program according to which the machine 1 executes its movements and activities required for performing the machining operations.

When close contact between the terminal surfaces 4 of the shaft portion 2 and of the shaft journals 3 has been reached, the induction rings 31,32 are caused to assume a position relative to the mutually abutting terminal surfaces 4 such that in the axial direction the rings 31,32 are situated symmetrically on either side of the terminal surfaces 4. Their distance from the outer surface of the shaft portion 2 and shaft journal 3 will be of the order of 7 mm±1 mm in cases where the outside diameter of the terminal surfaces 4 is of the order of 150 mm. The distance between the induction rings 31,32 in the axial direction will be of the order of 5 mm.

In a conventional manner, electrical energy is supplied from an electric source (not depicted) to the induction rings via leads 11. The rings 31,32 are each advantageously made of copper with a core through which coolant flows. In this case the core is supplied with coolant in the form of water pumped through pipes 12 to the rings 31,32. The rings and the energy supplied to them provide an inducing power of the order of 30 kW. With the steel material commonly used for the shaft parts here concerned and the relatively large material thicknesses required for achieving the necessary strength, the induction rings 31,32 can heat the relevant weld region on both sides round the mutually abutting terminal surfaces 4 to temperatures in the range of 250 to 350° C. With material thicknesses exceeding 7 mm, the thickness of the region to be heated to said range needs to be equal to at least 200% of the thickness of the material, advantageously the induction-heated region represents between 300 and 400% of the material thickness.

In conjunction with the axial movement of the induction heating arrangement 31,32, a laser welder unit 40 is also caused to assume a position central to the mutually abutting terminal surfaces 4. With advantage, the laser welder unit 40 accompanies the movement described above of the induction rings 31,32. The unit 40 may also be mounted pivotably on the machine's central member 22 so that the same unit can perform welding operations at both shaft ends of the rear axle beam 2. The laser welder's beam is arranged to pass through a purpose-made aperture (not depicted) provided by a widening between the induction rings 31,32.

The laser welder unit 40 is of a kind known per se capable of delivering an output power exceeding 10 kW. As soon as the predetermined position has been reached, the induction heating starts while the mutually abutting workpieces 2,3 rotate slowly or remain stationary. Once the heated material reaches the predetermined temperature, which is comparable with heating at a certain power having proceeded for a certain time, the laser welding begins.

The laser welder unit 40 remains stationary at a position between nine o'clock and three o'clock, advantageously at a twelve o'clock position, with the laser beam directed essentially radially relative to the central axis 5 of the mutually abutting workpieces, i.e. the axle beam 2 and the respective shaft journal 3. These workpieces 2,3 rotate in simultaneous contact at a speed determined by the welding rate desired with the particular laser unit 40. The welding rate and hence the rotation of the workpieces 2,3 should exceed 2 cm/s and is advantageously of the order of 8 cm/s.

The laser welding takes place with focusing of the laser beam on between 0 and 30% of the material thickness within the outer surface. In the case of material thicknesses between 7 and 15 mm, the beam creates with advantage a weld seam 10 which will be only a few millimetres wide, advantageously between 2 and 5 mm. At the same time, however, the width d of the radially inner surface of the seam will be slightly smaller than the width e of the outer part of the seam 10. Care should nevertheless be taken to ensure that the inner end surface of the weld seam 10 will be at a radial distance of at least about 0.2 times the material thickness of the contact surfaces 4 from its outer surface. It will thus be possible, when the shaft is under load during operation, for the force flow through the contact surfaces 4 to pass sufficiently far away from any crack indications on the inner end surface of the weld seam 10.

The invention claimed is:

1. A vehicle shaft comprising:
   a rigid intermediate portion of the shaft, the intermediate portion having first and second ends having respective first and second contact surfaces, each of contact surface having a respective material thickness and a cross section across the shaft;
   a first and a second shaft journal located at the first and second ends of the intermediate portion respectively, with the first shaft journal having a third end disposed with a third contact surface at the first end of the intermediate portion and the second shaft journal having a fourth end with a fourth contact surface disposed at the second end of the intermediate portion;
   a first weld connection between the first end of the intermediate portion and the third end of the first shaft journal at the first and the third contact surfaces and a second weld connection between the second end of the intermediate portion and the fourth end of the second shaft journal at the second and the fourth contact surfaces, the first and third contact surfaces at the first weld have the same material thickness and the second and fourth contact surfaces at the second weld have the same material thickness;
   at least one of the intermediate portion and the respective shaft journals at the ends of the intermediate portion has a respective cross section that is shaped to have a respective material thickness reduction thereat, and the thickness reduction is spaced at an axial distance from the contact surfaces between the shaft portion and each of the shaft journals, the axial distance being less than the material thickness at the respective contact surfaces.

2. The vehicle shaft of claim 1, wherein the material thickness reduction is between 25% and 50% of the material thickness of the contact surfaces.

3. The vehicle shaft of claim 1, wherein both the intermediate portion and the respective shaft journal toward each of the first and second weld regions has a material thickness reduction thereat reduced from the material thickness at the respective contact surfaces between the shaft portion and each of the shaft journals.

4. The vehicle shaft of claim 3, wherein the material thickness reduction is in the range of 15 to 30% of the material thickness at the respective contact surface.

5. The vehicle shaft of claim 1, wherein the material thickness reduction is in the range of 15 to 30% of the material thickness at the respective contact surface.

6. The vehicle shaft of claim 1, wherein the shaft journals have the material thickness reduction.

7. The vehicle shaft of claim 1, wherein both of the first and third contact surfaces at the first weld region have the same cross section and orientation and both of the second and fourth contact surfaces at the second weld region have the same cross section and orientation.

8. A process for manufacturing a vehicle shaft having shaft journals welded to opposite shaft ends of an intermediate rigid shaft portion and wherein the axial end surfaces of the intermediate shaft and the opposing end surfaces of the respective journals are contact surfaces having substantially the same material thickness, the process comprising:
  machining the end surfaces of the intermediate rigid shaft and the opposing end surfaces of the shaft journals to radial planes relative to an axis of symmetry, abutting each of the end surfaces of the intermediate shaft with the end surface of the respective shaft journal in a fixed position with a predetermined dimensional tolerance as to concentricity and parallelism of the two journals;
  laser welding the opposing end surfaces of the intermediate shaft and of the respective ones of the shaft journals by focusing the laser beam so as to form a weld seam at a welding rate in excess of 2 cm/s with sufficient electric power so that the weld seam may fully penetrate the material of the intermediate shaft portion and the respective shaft journal and such that the concentricity and parallelism of the two shaft journals will be within predetermined dimensional tolerances after the welding and after a subsequent cooling of the material.

9. The process of claim 8, wherein a laser welder is used for the laser welding, the method comprising supplying the laser welder with a predetermined electric power exceeding 10 kW and with a laser beam produced by the laser welder and focusing the laser beam between 0 and 4 mm within the outer surface for forming the weld seam at the welding rate exceeding 2 cm/s.

10. The process of claim 8, wherein both the shaft journals and the intermediate shaft portion therebetween are made of steel.

11. The process of claim 8, further comprising preheating a part section through the contact surfaces within a predetermined first region which surrounds the parts section to an equal extent so that the first region reaches at least a predetermined temperature before welding; and
  welding the part section while rotating the journals and the intermediate shaft portion for producing a weld seam between the end surfaces of the shaft and the journal that has an outer width within the first region.

12. The process of claim 11, further comprising:
  the preheating of the part section through the contact surface comprises induction heating which is synchronized to effect axial movement to an intended preheating position in conjunction with axial movement of the shaft journal moving in contact with the intermediate shaft portion, wherein the preheating position is centered in the axial direction relative to the part section of the contact surfaces between the shaft journal and the intermediate shaft portion.

13. The process of claim 8, wherein the material thickness at the contact surfaces is greater than 7 mm and the welding is performed by a welding apparatus that supplies electric power exceeding 10 kW and that focuses welding energy between 0 and 4 mm within the outer surface.

14. The process of claim 8, wherein before they are brought into contact, providing the shaft portion and each of the shaft journals with a first material thickness spaced at a distance from the respective contact surfaces thereof, and the distance is equal to less than to half the material thickness at the contact surface, and the first material thickness is less than the material thickness at the respective contact surface.

15. An arrangement for welding a respective shaft journal to each end of an intermediate rigid shaft portion of a vehicle shaft, the arrangement comprising:
  an inner machine member including a fixture for fastening thereto an intermediate shaft portion;
  two mutually opposite outer machine members each including a chuck for fastening a respective shaft journal; the outer machine members including reduction heaters arranged surrounding the respective shaft journals and having a symmetrical position relative to the contact surface of the shaft journal end abutting the intermediate shaft during the welding process;
  a movement device for moving and clamping the respective chucks holding their shaft journals to the intermediate shaft portion;
  a welding device operable for welding the contact surface of each of the journals to the respective ends of the intermediate rigid shaft portion; the welding device comprising a laser welder having a beam cone during welding; and aperture in the induction heater being so positioned and the laser welding device also being so positioned that the beam cone of the laser welder passes through the aperture in the induction heater; and
  the device for axial movement is arranged so that after the preheating, the axial movement device moves toward the chuck to release the shaft journals welded to the intermediate shaft portion.

16. The arrangement of claim 15, wherein the induction heater comprises two parallel spaced apart rings which during the welding have a symmetrical position on either side of the contact surfaces of each shaft journal end abutting an end of the intermediate shaft, the rings having upper parts with mutually widened arcuate configurations between which the beam cone of the laser welding device passes during the welding.

* * * * *